(12) United States Patent
Mazyar et al.

(10) Patent No.: US 9,150,771 B2
(45) Date of Patent: Oct. 6, 2015

(54) THERMALLY CONDUCTIVE NANOCOMPOSITION AND METHOD OF MAKING THE SAME

(71) Applicants: Oleg A. Mazyar, Houston, TX (US); Ashley D. Leonard, Houston, TX (US); Joshua C. Falkner, Richmond, TX (US)

(72) Inventors: Oleg A. Mazyar, Houston, TX (US); Ashley D. Leonard, Houston, TX (US); Joshua C. Falkner, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/448,078

(22) Filed: Jul. 31, 2014

(65) Prior Publication Data

US 2014/0339780 A1 Nov. 20, 2014

Related U.S. Application Data

(62) Division of application No. 13/364,515, filed on Feb. 2, 2012, now Pat. No. 8,840,803.

(51) Int. Cl.
| | |
|---|---|
| *C09K 5/10* | (2006.01) |
| *B26D 7/08* | (2006.01) |
| *C09K 5/14* | (2006.01) |
| *E21B 43/12* | (2006.01) |
| *B62D 7/08* | (2006.01) |
| *F16J 15/02* | (2006.01) |

(52) U.S. Cl.
CPC ... *C09K 5/14* (2013.01); *B62D 7/08* (2013.01); *C09K 5/10* (2013.01); *E21B 43/128* (2013.01); *F16J 15/02* (2013.01); *Y10T 83/041* (2015.04)

(58) Field of Classification Search
USPC ......... 977/742, 755, 762, 773, 775, 779, 784, 977/785, 786, 831, 833, 948; 252/74, 75, 252/78.1
See application file for complete search history.

(56) References Cited

U.S. PATENT DOCUMENTS

| | | | |
|---|---|---|---|
| 5,094,769 A | 3/1992 | Anderson, Jr. et al. | |
| 5,923,945 A | 7/1999 | Eisman et al. | |
| 2007/0034354 A1* | 2/2007 | Tung et al. | 165/80.4 |
| 2007/0054122 A1 | 3/2007 | Paisner et al. | |
| 2008/0312111 A1* | 12/2008 | Malshe et al. | 508/155 |
| 2009/0042751 A1* | 2/2009 | Narayan | 508/155 |
| 2010/0009165 A1* | 1/2010 | Patel et al. | 428/323 |
| 2011/0242828 A1 | 10/2011 | Blincoe et al. | |

FOREIGN PATENT DOCUMENTS

| | | | | |
|---|---|---|---|---|
| CN | 101698808 A | | 4/2010 | |
| JP | 2011-102203 | * | 5/2011 | ............ C01B 21/064 |
| JP | 2011102203 A | | 5/2011 | |
| JP | 2011157540 A | | 8/2011 | |

OTHER PUBLICATIONS

Chomerics (Division of Parker Hannifin Corporation), "Thermal Management Products," pp. 18-36 published Oct. 1999.*
Chomerics, Division of Parker Hannifin Corporation, "Thermal Management Products", Oct. 1999, No. 5509; see pp. 18-36.
Chunyi Zhi et al., "Highly Thermo-conductive Fluid with Boron Nitride Nanofillers," ACS NANO, vol. 5, No. 8, 6571-6577, 2011.
Dmitri Golberg et al., "Boron Nitride Nanotubes and Nanosheets," ACS NANO, vol. 4, No. 6, 2979-2993, 2010.
International Search Report, International Application No. PCT/US2012/071743, Date of Mailing Apr. 29, 2013; Korean Intellectual Property Office, pp. 1-3.

* cited by examiner

*Primary Examiner* — Robert Harlan
(74) *Attorney, Agent, or Firm* — Cantor Colburn LLP (57) ABSTRACT

In an embodiment is a seal including an elastomer; and boron nitride nanoparticles disposed in the elastomer, wherein the seal is thermally conductive and electrically insulating. In another embodiment, is a method of making a seal, the method includes compounding an elastomer with boron nitride nanoparticles to provide a composition; and molding the composition into a shape.

21 Claims, 1 Drawing Sheet

THERMALLY CONDUCTIVE NANOCOMPOSITION AND METHOD OF MAKING THE SAME

CROSS REFERENCE TO RELATED APPLICATIONS

This application is a divisional of U.S. application Ser. No. 13/364,515 filed Feb. 2, 2012, the disclosure of which is incorporated by reference herein in its entirety.

BACKGROUND

Hydrocarbon and silicone fluids, e.g., oils, can provide electrical isolation between a stator and rotor and also power leads in an electric motor. Additionally, oils provide lubrication for engines and motors to extend lifetime and prevent failure. Motor oils lubricate surfaces in relative motion and close contact to one another, such as for example, bearings and other metal surfaces, to improve motor efficiency and motor run life. Additionally, oils can be useful for carrying away heat that is generated within the motor, thereby reducing the operating temperature.

A broad range of electrical resistivities, thermal conductivities, and fluid properties exist among oils. Oils are generally selected based upon a desired viscosity at a specified operating temperature. Preferably, oils are selected to ensure efficient operation of a motor or engine at desired operating temperatures by providing sufficient viscosity for lubrication.

Even for electrical devices without moving parts, heat transfer from static components and their electrical isolation are considerations, particularly in high voltage or high current applications. Additional equipment is sometimes needed to aid the cooling of these devices. New materials for electrical insulation and thermal conduction having suitable viscosities would be well-received in the art.

BRIEF DESCRIPTION

The above and other deficiencies of the prior art are overcome by, in an embodiment, a nanocomposite fluid comprising: a fluid medium; and a nanoparticle composition comprising nanoparticles which are electrically insulating and thermally conductive.

In an embodiment is a seal including an elastomer; and boron nitride nanoparticles disposed in the elastomer, wherein the seal is thermally conductive and electrically insulating.

In another embodiment, is a method of making a seal, the method includes compounding an elastomer with boron nitride nanoparticles to provide a composition; and molding the composition into a shape.

BRIEF DESCRIPTION OF THE DRAWINGS

The following descriptions should not be considered limiting in any way. With reference to the accompanying drawing, like elements are numbered alike.

DETAILED DESCRIPTION

Figure 1:
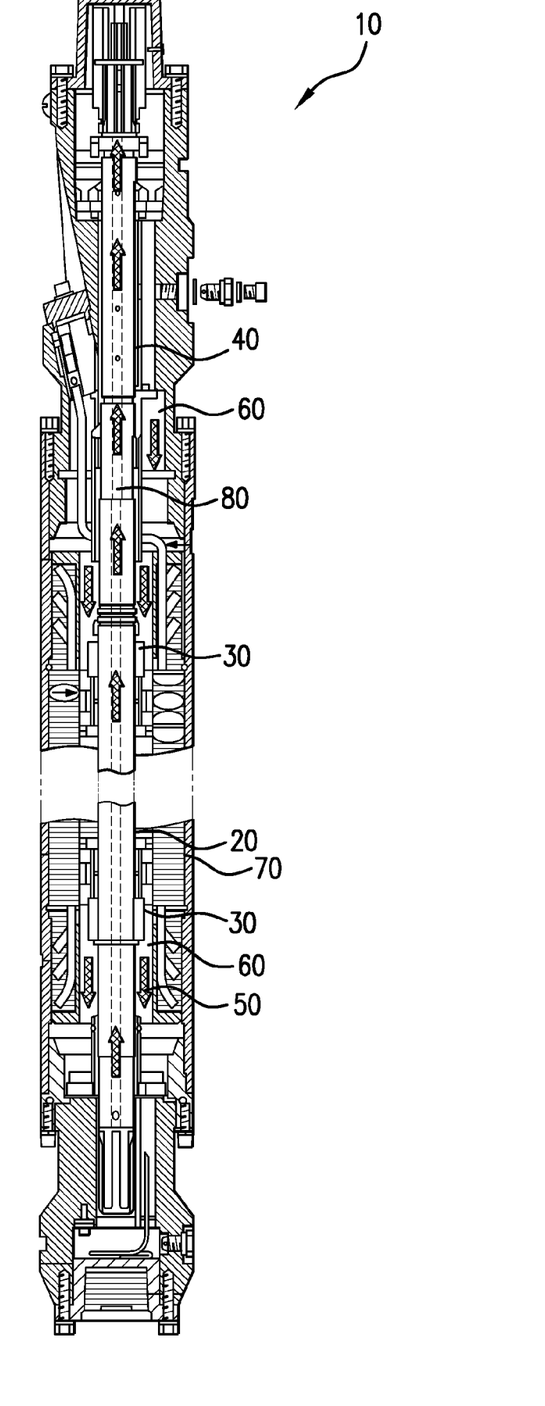
The FIGURE shows a cross-section of a downhole, electric submersible pump configured to use a nanocomposite fluid.

A detailed description of one or more embodiments of the disclosed apparatus and method are presented herein by way of exemplification and not limitation with reference to the FIGURE.

It has been found that a composition of electrically insulating and thermally conductive nanoparticles in a fluid medium provides thermal conduction and electrical resistance to the composition. Advantageously, the viscosity of the fluid and electrical characteristics can be tuned by varying the amount of the nanoparticles in the fluid medium. Such fluids are useful as materials for thermal management and electrical insulation. Additionally, compositions of the nanoparticles and elastomers can be combined to provide electrically insulating, thermally conductive articles such as seals.

In an embodiment, a nanocomposite fluid includes a fluid medium and a nanoparticle composition that includes nanoparticles that are electrically insulating and thermally conductive. According to an embodiment, the nanoparticles are boron nitride.

Boron nitride is amorphous or crystalline, with at least three crystal forms (hexagonal, cubic, and wurtzite). Hexagonal boron nitride (h-BN) is structurally similar to graphite and also occurs in separated layers of covalently bound boron nitride. Cubic boron nitride (c-BN) is similar to the diamond allotrope of carbon and has a sphalerite structure. Wurtzite boron nitride (w-BN) has a structure similar to that of the lonsdaleite carbon polymorph, having tetrahedrally bonded boron and nitrogen atoms in a hexagonal covalent network. However, unlike the some of the corresponding carbon forms, boron nitride is electrically insulating with a high degree of thermal conductivity.

Nanoparticles are generally particles having an average particle size, in at least one dimension, of less than one micrometer (μm). As used herein "average particle size" refers to the number average particle size based on the largest linear dimension of the nanoparticle (sometimes referred to as "diameter"). Particle size, including average, maximum, and minimum particle sizes, can be determined by an appropriate method of sizing particles such as, for example, static or dynamic light scattering (SLS or DLS) using a laser light source. Nanoparticles include both particles having an average particle size of 250 nanometers (nm) or less, and particles having an average particle size of greater than 250 nm to less than 1 μm (sometimes referred in the art as "sub-micron sized" particles). In an embodiment, a nanoparticle has an average particle size of about 0.1 to about 500 nm, in another embodiment, 0.5 to 250 nm, in another embodiment, about 1 to about 150 nm, and in another embodiment about 1 to about 75 nm. The nanoparticles are monodisperse, where all particles are of the same size with little variation, or polydisperse, where the particles have a range of sizes and are averaged. Generally, polydisperse nanoparticles are used. In another embodiment, nanoparticles of different average particle sizes are used, and in this way, the particle size distribution of the nanoparticles is unimodal (exhibiting a single distribution), bimodal exhibiting two distributions, or multimodal, exhibiting more than one particle size distribution.

The minimum particle size for the smallest 5% of the nanoparticles is less than 0.5 nm, in an embodiment less than or equal to 0.2 nm, and in another embodiment less than or equal to 0.1 nm. Similarly, the maximum particle size for 95% of the nanoparticles is greater than or equal to 900 nm, in an embodiment greater than or equal to 750 nm, and in another embodiment greater than or equal to 500 nm.

The nanoparticles have a high surface area of greater than 180 m$^2$/g, in an embodiment, 300 m$^2$/g to 1800 m$^2$/g, and in another embodiment 500 m$^2$/g to 1500 m$^2$/g.

Examples of the nanoparticle material include nanotubes, nanospheres, nanosheets, nanowires, nanorods, or a combination comprising at least one of the foregoing.

Nanotubes (also referred to as boron nitride nanotubes (BNNT)) are tubular (fullerene-like) structures having open or closed ends and are made entirely or partially of boron and nitrogen. In an embodiment, nanotubes include additional components such as chalcogens, nonmetals, or metalloids, which are incorporated into the structure of the nanotube, included as a dopant, form a surface coating, or a combination comprising at least one of the foregoing. However, no additional component is included that causes the nanoparticles to conduct electricity or to become thermally insulating. Nanotubes can be single walled nanotubes (SWNTs) or multi-walled nanotubes (MWNTs). BNNTs can be prepared in a similar manner as the corresponding carbon nanotubes. The aspect ratio, i.e., the ratio of the length of the nanotube to its diameter, can be about 1 to about 700, specifically about 5 to about 500, and more specifically about 10 to about 400.

Nanospheres (also referred to as boron nitride nanospheres (BNNS)) include cage-like hollow allotropic forms of boron nitride possessing a polyhedral structure. Nanospheres include, for example, structures having about 20 to about 100 carbon atoms. For example, $B_{12}N_{12}$ is a nanosphere having 24 total atoms and can include different polygons (e.g., squares and hexagons) in its structure. Other nanosphere structures may include polygons having an odd number of atoms. With appropriate choice of starting materials, BN nanospheres can be prepared in a similar matter as the corresponding carbon fullerenes. For example, BN nanospheres can be made under CVD conditions starting from trimethoxy borane and ammonia. The diameter of the nanospheres can be from about 5 nm to less than 1 μm, specifically about 5 nm to about 900 nm, and more specifically about 5 nm to about 800 nm.

Nanosheet (also referred to a boron nitride nanosheet) is a cluster of plate-like sheets of h-BN having a stacked structure of one or more layers of h-BN (a plate-like two-dimensional structure of fused hexagonal rings made of covalently bonded boron and nitrogen atoms) electrostatically bonded to one another. Nanosheet has both micro- and nano-scale dimensions, such as for example an average particle size of 1 to 20 μm, in an embodiment 1 to 15 μm, and an average thickness (smallest) dimension in nano-scale dimensions, and an average thickness of less than 1 μm, in an embodiment less than or equal to 700 nm, in another embodiment less than or equal to 500 nm, in yet another embodiment less than or equal to 50 nm, in an embodiment less than or equal to 25 nm, and in a further embodiment less than or equal to 10 nm In an embodiment, the nanoparticle is h-BN including nanosheet and h-BN fibers (i.e., h-BN particles having an average largest dimension of greater than 1 μm, a second dimension of less than 1 μm, and an aspect ratio of greater than 10, where the h-BN particles form an inter-bonded chain). An exemplary nanosheet has an average particle size of 1 to 5 μm, and in an embodiment 2 to 4 μm. In another embodiment, smaller nanoparticles or sub-micron sized particles are combined with nanoparticles having an average particle size of greater than or equal to 1 μm. In a specific embodiment, the nanoparticle is a derivatized nanosheet. In another embodiment, the nanoparticle is a nanosheet having two sheets of h-BN.

Nanosheet, can be prepared by, for example, exfoliation of a thicker nanosheet (i.e., from a nanosheet having more layers of h-BN) or by a synthetic procedure by "unzipping" a BN nanotube to form a nanosheet ribbon, which can be followed by derivatization of the nanosheet to prepare a nanosheet oxide. Exfoliation to form thinner nanosheet is carried out by exfoliation of a nanosheet source such as nanosheet or intercalated nanosheet (where, e.g., an atom or compound is disposed in the register of the nanosheet). Exemplary exfoliation methods include, but are not limited to, fluorination, acid intercalation, acid intercalation followed by high temperature treatment, and the like, or a combination comprising at least one of the foregoing. Alternatively, exfoliation can be accomplished by contacting a nanosheet with an adhesive tape and peeling the tape from the nanosheet to produce two thinner nanosheets. Exfoliation of the nanosheet provides a nanosheet having fewer layers than non-exfoliated nanosheet. It will be appreciated that exfoliation of nanosheet may provide the nanosheet as a single sheet only one molecule thick, or as a layered stack of relatively few sheets. In an embodiment, exfoliated nanosheet has fewer than 50 single sheet layers, in an embodiment fewer than 20 single sheet layers, in another embodiment fewer than 10 single sheet layers, and in another embodiment fewer than 5 single sheet layers.

The BN nanoparticles can be derivatized to include a variety of different functional groups such as, for example, hydroxy, epoxy, ether, ketone, amine, alkoxy, alkyl, aryl, aralkyl, alkaryl, lactone, functionalized polymeric or oligomeric groups, and the like. In an embodiment, the nanoparticle is functionalized to include a hydrophilic functional group including hydroxy, carboxylic acid, amine, lactone, polyethylene glycol, a hydrophilic polymer, or a combination comprising at least one of the foregoing. In another embodiment, nanoparticles include a combination of derivatized nanoparticles and underivatized nanoparticles. According to an embodiment, the functional group is a alkyl group, hydroxyl group, or a combination comprising at least one of the foregoing. Such functional groups aid dispersion of the boron nitride nanoparticles in a variety of fluid media. In an embodiment, the functional group is the hydroxy group, which allows dispersal of the boron nitride nanoparticles in an aqueous fluid medium. In a further embodiment, the functional group is a C2-C100 alkyl group (branched or linear, which can be substituted with a heteroatom) to disperse the boron nitride nanoparticles in an oil containing fluid medium.

In addition to the boron nitride nanoparticles, the nanocomposite fluid includes a fluid medium. The nanocomposite fluid including the fluid medium herein is useful as a fluid in, for example, an electric submersible pump (ESP), electric transformer, motor, electric discharge machining, and like devices and environments where electrically insulating fluids and/or thermally conductive fluids are used. In an embodiment, the fluid medium is a hydrophilic fluid. Alternatively, the fluid medium is a hydrophobic fluid. In some embodiments, the nanocomposite fluid can be amphiphilic. Examples of the fluid medium include water, oil, synthetic oil (e.g., fluorinated oils and silicon-containing oils), distillate oil, or a combination comprising at least one of the foregoing. The fluid medium is a dielectric; therefore, in the case of aqueous fluid media, for example water, de-ionized water can be used. Further, electrolytic components (for example, water soluble salts or ionic compounds) are not included in the fluid medium or nanocomposite fluid. Alternatively, the nanocomposite fluid is substantially free of electrolytic components.

Exemplary hydrophilic fluid media include but are not limited to water (which will be understood to be de-ionized water), C1-C10 alcohols (including polyhydric compounds), ammonia, ethers (e.g., dimethyl ether, diethyl ether), tetrahydrofuran, dioxane, esters (e.g., methyl acetate), ketones (e.g., acetone), aldehydes (e.g., acetaldehyde), or a combination comprising at least one of the foregoing.

Suitable hydrophobic fluid media are hydrocarbon-based and can be oils (also referred to as natural oils), distillate oils, or synthetic oils, or a combination thereof. As used herein, "natural oil" refers to a naturally occurring liquid or crude oil comprising a mixture of hydrocarbons having various molecular weights, which may have been recovered from a subsurface rock formation, and which may have been subjected to a refining process by distillation or otherwise. As used herein, synthetic oil refers to a hydrocarbon liquid that comprises chemical compounds not originally present in a natural oil, but were instead synthesized from other compounds.

The fluid medium can be any natural oil, various petroleum distillates, or synthetic oil in any rheological form, including liquid oil, grease, gel, oil-soluble polymer composition, or the like, particularly the mineral base stocks or synthetic base stocks used in the lubrication industry, e.g., Group I (solvent refined mineral oils), Group II (hydrocracked mineral oils), Group III (severely hydrocracked oils, sometimes described as synthetic or semi-synthetic oils), Group IV (polyalphaolefins (PAOs)), and Group V (esters (e.g., polyols esters), naphthenes, polyalkylene glycols, silicone oil, fluorinated compounds (e.g., polyhexafluoropropylene oxide, perfluoropolyether (PFPE), perfluoroalkylether (PFAE), and perfluoropolyalkylether (PFPAE)), and the like). Examples include polyalphaolefins, synthetic esters, and polyalkylglycols.

Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(l-octenes), poly(1-decenes), etc., and mixtures thereof); alkylbenzenes (e.g., dodecylbenzenes, tetradecylbenzenes, dinonylbenzenes, di-(2-ethylhexyl), benzenes, etc.); polyphenyls (e.g., biphenyls, terphenyls, alkylated polyphenyls, etc.); alkylated diphenyl ethers; alkylated diphenyl sulfides; derivatives, analogs and homologs thereof; and the like. Alkylene oxide polymers and interpolymers and derivatives thereof where the terminal hydroxyl groups have been modified by esterification, etherification, etc., constitute another class of synthetic oils. Combinations of the synthetic oils can be used together.

Another suitable class of synthetic oils includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, alkenyl malonic acids, etc.) with a variety of alcohols (e.g., butyl alcohol, hexyl alcohol, dodecyl alcohol, 2-ethylhexyl alcohol, ethylene glycol, diethylene glycol monoalkylethers, propylene glycol, etc.). Specific examples of these esters include dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from C5 to C12 monocarboxylic acids and polyols and polyol ethers such as neopentyl glycol, trimethylolpropane, pentaerythritol, dipentaerythritol, tripentaerythritol, etc. Other synthetic oils include liquid esters of phosphorus-containing acids (e.g., tricresyl phosphate, trioctyl phosphate, diethyl ester of decylphosphonic acid, etc.), polymeric tetrahydrofurans and the like.

In a non-limiting embodiment, the nanocomposite fluid includes the fluid medium and the nanoparticle composition. The nanoparticle composition (excluding functional groups) is present in an amount of about 0.001 weight percent (wt %) to about 15 wt %, specifically about 0.01 wt % to about 10 wt %, and more specifically about 0.01 wt % to about 5 wt %, based on the weight of the nanocomposite fluid. In an embodiment, the balance of the nanocomposite fluid is the fluid medium. According to another embodiment, the fluid medium is present in an amount of about 20 wt % to about 99.999 wt %, specifically about 30 wt % to about 90 wt %, and more specifically about 40 wt % to about 85 wt %, based on the weight of the nanocomposite fluid.

The nanoparticle composition can include more than one type of nanoparticle. According to an embodiment, the nanoparticle composition includes a first boron nitride nanoparticle and a second boron nitride nanoparticle. The first boron nitride nanoparticle can be present in an amount of about 0.001 wt % to about 15 wt %, specifically about 0.01 wt % to about 10 wt %, and more specifically about 0.01 wt % to about 5 wt %, based on the weight of the nanocomposite fluid. Likewise, the second boron nitride nanoparticle can be present in an amount of about 0.001 wt % to about 15 wt %, specifically about 0.01 wt % to about 10 wt %, and more specifically about 0.01 wt % to about 5 wt %, based on the weight of the nanocomposite fluid. In an embodiment, the first and second nanoparticle can be any boron nitride nanoparticle herein. Particularly, the first nanoparticle is a boron nitride nanotube, and the second nanoparticle is a boron nitride nanosphere. More particularly, the BNNT is present in amount of about 0.001 wt % to about 2 wt %, and the BNNS is present in an amount of about 0.001 wt % to about 5 wt %.

The nanocomposite fluid can have additives that tailor the fluid properties for use in many different conditions such as aqueous or hydrocarbon environments, various temperature and/or pressure ranges, viscosity-dependent processes, and the like. Exemplary additives include but are not limited to a microparticle, ceramic, surfactant, solvent, additive nanoparticle (which is different than the nanoparticles discussed above, i.e., the boron nitride nanoparticles), or a combination comprising at least one of the foregoing. The nanocomposite fluid can include additional chemical compounds, including but not limited to, anti-oxidants, detergents, friction modifiers, viscosity modifiers, corrosion inhibiting additives, anti-wear additives, anti-foam agents, conditioners, and the like. Combinations of the additives and chemical compounds can be used. The additives and additional chemical compounds should not cause the nanocomposite fluid to substantially decrease its dielectric strength or thermal conductivity so as to electrically breakdown or become thermally insulating. It should be appreciated that, in some instances, an additive may slightly increase the electrical conductivity or slightly decrease the thermal conductivity of the nanocomposite fluid. As used herein, "slightly" refers to a change in the electrical and thermal properties by a relative difference of less than 20% of the original value.

In an embodiment, the nanocomposite fluid can include microparticles. As used herein, microparticles include particles having an average particle size of greater than or equal to about 1 micrometer (μm), particularly about 1 μm to about 250 μm, more particularly about 1 μm to about 200 μm, and even more particularly about 1 μm to about 150 μm.

Additive microparticles may be formed from any suitable additive material. In an exemplary embodiment, additive microparticles can be formed from the same material as the nanoparticles, i.e., the additive microparticles are boron nitride. In another exemplary embodiment, additive microparticles can be formed from a different material than that of the nanoparticles. In one exemplary embodiment, microparticles comprise diamond microparticles.

Exemplary additive nanoparticles or microparticles can include, but are not limited to a fullerene, graphene (including nanographene and nanographite platelets), graphite (including graphite fiber), nanodiamond, ceramic, carbon nanotubes, inorganic nanotubes, carbon nano-onions, nanowires, nanorods, polysilsesquioxanes, nanoclays, or a combination comprising at least one of the foregoing. In an embodiment, the additive nanoparticle is at least slightly suspended in the nanocomposite fluid. Exemplary shapes of the individual additive nanoparticles can include single or multi-walled nanotubes, spheres, balls, platelets, sheets, ribbons, and annular shapes. Dimensions of the additive nanoparticles are similar to or the same as the boron nitride nanoparticles herein. For example, the additive nanoparticles can have a unimodal or multimodal size distribution.

Additive carbon nanoparticles may include various graphite, graphene, single-wall or multi-walled carbon nanotubes, fullerene, nanodiamond, or a combination thereof. Exemplary fullerenes include buckeyballs, buckeyball clusters, buckeypapers, single-wall carbon nanotubes or multi-wall carbon nanotubes, or a combination thereof. Additive inorganic nanoparticles may include, for example, various ceramic nanoparticles, including combinations thereof.

The additive nanoparticles or microparticles used herein can have any suitable shape, including various spherical, tubular and plate-like or planar shapes. These shapes may be symmetrical, irregular, or elongated shapes. They may have a low aspect ratio (i.e., largest dimension to smallest dimension) of less than 10 and approaching 1 in various spherical particles. They also can have a two-dimensional aspect ratio (i.e., diameter to thickness for elongated additive nanoparticles such as carbon nanotubes or diamondoids; or ratios of length to width, at an assumed thickness or surface area to cross-sectional area for plate-like additive nanoparticles such as, for example, nanographene or nanoclays) of greater than or equal to 10, specifically greater than or equal to 100, more specifically greater than or equal to 200, and still more specifically greater than or equal to 500. Similarly, the two-dimensional aspect ratio for such additive nanoparticles may be less than or equal to 10,000, specifically less than or equal to 5,000, and still more specifically less than or equal to 1,000.

Fullerene additive nanoparticles, as disclosed herein, may include any of the known cage-like hollow allotropic forms of carbon possessing a polyhedral structure. Fullerenes may include, for example, polyhedral buckyballs of about 20 to about 100 carbon atoms. For example, $C_{60}$ is a fullerene having 60 carbon atoms and high symmetry ($D_{5h}$), and is a relatively common, commercially available fullerene. Exemplary fullerenes include, for example, $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like. Fullerene nanoparticles may also include buckeyball clusters. A carbon nanotube is a carbon-based, tubular fullerene structure having open or closed ends and which may be made entirely or partially of carbon, and may also include components such as metals or metalloids. Additive nanotubes, including carbon nanotubes, may be single-wall nanotubes (SWNTs) or multi-wall nanotubes (MWNTs).

An additive graphite nanoparticle or microparticle includes a cluster of plate-like or planar sheets of graphite, in which a stacked structure of one or more layers of the graphite, which has a plate-like two dimensional structure of fused hexagonal rings with an extended delocalized π-electron system, layered and weakly bonded to one another through π-π stacking interaction. Additive graphene nanoparticles, may be a single sheet or several sheets of graphene (e.g., nanographite platelets) having nano-scale dimensions, such as an average particle size (average largest dimension) of less than e.g., 500 nanometers (nm), or in other embodiments may have an average largest dimension less than about 1000 nm. Additive nanographene may be prepared by exfoliation of nanographite or by catalytic bond-breaking of a series of carbon-carbon bonds in a carbon nanotube to form a nanographene ribbon by an "unzipping" process, followed by derivatization of the nanographene to prepare, for example, an additive nanographene oxide.

Diamondoids can include carbon cage molecules such as those based on adamantane ($C_{10}H_{16}$), which is the smallest unit cage structure of the diamond crystal lattice, as well as variants of adamantane (e.g., molecules in which other atoms (e.g., N, O, Si, or S) are substituted for carbon atoms in the molecule) and carbon cage polyadamantane molecules including between 2 and about 20 adamantane cages per molecule (e.g., diamantane, triamantane, tetramantane, pentamantane, hexamantane, heptamantane, and the like).

Additive ceramic (microparticles and/or additive nanoparticles) is not particularly limited and can be selected depending on the particular application of the nanocomposite fluid. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$) or titania ($TiO_2$). The oxide-based ceramic, nitride-based ceramic, carbide-based ceramic, boride-based ceramic, or silicide-based ceramic can contain a nonmetal such as oxygen, nitrogen, boron, carbon, or silicon; a metal such as aluminum, lead, or bismuth; a transition metal such as niobium, tungsten, titanium, zirconium, hafnium, or yttrium; an alkali metal such as lithium or potassium; an alkaline earth metal such as calcium, magnesium, or strontium; a rare earth such as lanthanum or cerium; and a halogen such as fluorine or chlorine.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, can be prepared by acid and/or base-catalyzed condensation of functionalized silicon-containing monomers such as tetraalkoxysilanes (including tetramethoxysilane and tetraethoxysilane) and alkyltrialkoxysilanes (such as methyltrimethoxysilane and methyltriethoxysilane).

Nanoclays are hydrated or anhydrous silicate minerals with a layered structure and include, for example, aluminosilicate clays such as kaolins including hallyosite, smectites including montmorillonite, illite, and the like. Exemplary nanoclays include those marketed under the tradename CLOISITE® marketed by Southern Clay Additives, Inc. Nanoclays are exfoliated to separate individual sheets, or are non-exfoliated, and further, are dehydrated or included as hydrated minerals. Other nano-sized mineral fillers of similar structure are also included such as, for example, talc, micas including muscovite, phlogopite, phengite, or the like.

The additive nanoparticles or microparticles can be functionalized to form a derivatized additive nanoparticle or derivatized microparticle using either inorganic or organic materials. In an embodiment, the additive nanoparticles or microparticles described herein can be functionalized by being coated with a chemically bonded inorganic material, including an inorganic material including a metal boride, carbide, nitride, carbonate, bicarbonate, or combinations thereof. According to another embodiment, the additive nanoparticles can be functionalized to form a derivatized additive nanoparticle that includes an organic functional group such as carboxy, epoxy, ether, ketone, amine, hydroxy, alkoxy, alkyl, lactone, aryl functional group, a polymeric or oligomeric group thereof, or a combination comprising at least one of the foregoing. In yet another embodiment, a variety of functional groups can be appended to the additive nanoparticles or microparticles. Exemplary functional groups include, but are not limited to, hydrocarbon and/or hydrocarbon derivatives. In certain embodiments, the functional group can be an alkyl, alkenyl, aromatic hydrocarbon, or mixtures or derivatives of these groups, or polymers of such. Exemplary alkyl groups include those of about 1 to about 50 carbon atoms (straight chain or branched) or polymeric species containing about 10 to about 20,000 carbon atoms. Optionally, the functional group can include a heteroatom, e.g., oxygen, sulfur, nitrogen, and the like. In certain embodiments, the functional group is hydrophobic.

In an exemplary embodiment, the derivatized additive nanoparticles are characterized by chemical bonding of the functionalizing material, such as an organic group, to the additive nanoparticles (or microparticles), particularly to the surface of the additive nanoparticles. This is in contrast, for example, to adsorption of surfactants on the surface of various additive nanoparticles or boron nitride nanoparticles used in the nanocomposite fluid.

In an embodiment, the additive nanoparticles (or microparticles) include carbon nanotubes, fullerenes, graphene including nanographene and graphene fiber, nano graphite, nanodiamonds, polysilsesquioxanes, inorganic nanoparticles including silica nanoparticles, nanoclays, or combinations comprising at least one of the foregoing.

The additive nanoparticles are chemically modified (e.g., by oxidation or derivatization) to have a resistivity effective to be non-conductive so that the nanocomposite fluid maintains its electrical insulating property and thermal conductivity. In an embodiment, the additive nanoparticle (e.g., additive carbon nanoparticle) is electrically insulating to maintain the nanocomposite fluid with a dielectric strength greater than or equal to 80 kV/cm.

In certain embodiments, the additive nanoparticle or microparticle can be present in an amount up to about 30% by volume, i.e., 30 volume percent (vol %), based on the volume of the nanocomposite fluid. Alternatively, the additive nanoparticle can be present in an amount up to about 20 vol %, based on the volume of the nanocomposite fluid. In other embodiments, the additive nanoparticle can be present in an amount up to about 10 vol %, based on the volume of the nanocomposite fluid. In certain embodiments, the additive nanoparticle can be present in an amount of about 0.001 vol % to about 15 vol %, specifically about 0.001 vol % to about 10 vol %, based on the volume of the nanocomposite fluid. Alternatively, the additive nanoparticle can be present in an amount of about 0.001 vol % to about 5 vol %, based on the volume of the nanocomposite fluid. In certain embodiments, the additive nanoparticle can be present in an amount of about 0.1 ppm to about 5 vol %, alternatively about 0.1 ppm to about 10 vol %, or further alternatively about 0.1 ppm to about 15 vol %, based on the volume of the nanocomposite fluid. In certain embodiments, the additive nanoparticle is present in an amount of at least 0.1 ppm, alternatively at least about 1 ppm, further alternatively at least about 10 ppm, or at least about 100 ppm, based on the volume of the nanocomposite fluid.

In some embodiments, the nanocomposite fluid includes more than one type of additive nanoparticle (or microparticle), wherein the total amount of additives can be up to about 30 vol %, specifically up to about 20 vol %, and more specifically up to about 10 vol %, based on the volume of the nanocomposite fluid. In other embodiments having more than one type of additive nanoparticles, the total concentration of additives can be about 0.001 vol % to about 15 vol %, based on the volume of the nanocomposite fluid.

Surfactants useful in the nanocomposite fluid include but are not limited to nonionic surfactants. Exemplary nonionic surfactants include fatty alcohols (e.g., cetyl alcohol, stearyl alcohol, cetostearyl alcohol, oleyl alcohol, and the like), polyoxyethylene glycol alkyl ethers (e.g., octaethylene glycol monododecyl ether, pentaethylene glycol monododecyl ether, and the like), polyoxypropylene glycol alkyl ethers (e.g., butapropylene glycol monononyl ether), glucoside alkyl ethers (e.g., decyl glucoside, lauryl glucoside, octyl glucoside), polyoxyethylene glycol octylphenol ethers (e.g., Triton X-100 (octyl phenol ethoxylate)), polyoxyethylene glycol alkylphenol ethers (e.g., nonoxynol-9), glycerol alkyl esters (e.g., glyceryl laurate), polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like), sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like), cocamide ethanolamines (e.g., cocamide monoethanolamine, cocamide diethanolamine, and the like), amine oxides (e.g., dodecyldimethylamine oxide, tetradecyldimethylamine oxide, hexadecyl dimethylamine oxide, octadecylamine oxide, and the like), block copolymers of polyethylene glycol and polypropylene glycol (e.g., poloxamers available under the trade name Pluronics, available from BASF), and polyethoxylated amines (e.g., polyethoxylated tallow amine).

The amount of the surfactant within the nanocomposite fluid can be about 0.05 wt % to about 50 wt %, specifically about 0.1 wt % to about 40 wt %, and more specifically about 1 wt % to about 25 wt %, based on the weight of the nanocomposite fluid.

According to an embodiment, the nanocomposite fluid includes a solvent. The solvent can be selected to be miscible with the fluid medium. In an embodiment, the solvent is an aprotic solvent. Examples of the aprotic solvent include tetrahydrofuran, dimethylformamide, ethyl acetate, acetone, acetonitrile, and the like. According to another embodiment, the solvent is a non-polar solvent or can be slightly polar. Examples of the non-polar solvent include hexane, pentane, diethyl ether, and the like. The amount of the solvent within the nanocomposite fluid can be about 0.05 wt % to about 50 wt %, specifically about 0.1 wt % to about 40 wt %, and more specifically about 1 wt % to about 25 wt %, based on the weight of the nanocomposite fluid.

In an embodiment, the nanocomposite fluid can be made by forming nanoparticles that are electrically insulating and thermally conductive, dispersing the boron nitride nanoparticles in a solvent, combining the boron nitride nanoparticles and a fluid medium, and removing the solvent to form the nanocomposite fluid. According to an embodiment, the nanoparticles include boron nitride. Such nanoparticles are discussed above.

The boron nitride nanoparticles can be produced by arc discharge, chemical vapor deposition, laser heating milled boron (at super-high or ambient pressure), plasma-enhanced pulsed laser deposition, and high-temperature heating of h-BN powder. In an embodiment, boron is ball milled to nano-sized particles that are mixed with a metal nitrate in ethanol, and the composition is subsequently annealed under nitrogen to form boron nitride nanotubes. Here, the annealing conditions can control the size and structure of the boron nitride nanotubes. In another embodiment, boron nitride nanotubes can be produced from reacting boron powder with magnesium oxide to produce $B_2O_2$, which is further reacted with ammonia to produce the BNNTs. Alternatively, boron nitride nanospheres can be made in a chemical vapor reaction involving $B(OCH_3)_3$ and ammonia at, for example, 900° C., followed by high-temperature annealing. According to yet another embodiment, boron nitride nanosheets (e.g., h-BN sheets) can be made by exfoliating h-BN from thicker sheets with adhesive tape (or a chemical exfoliant).

The boron nitride nanoparticles are dispersed in a solvent, which is the same or different than the solvent that is optionally present in the finished nanocomposite fluid. The solvent has a low boiling point, for example, less than 120° C., more particularly less than 100° C. The solvent can be, for example, acetone, dichloromethane, tetrahydrofuran, ethyl acetate, acetonitrile, methanol, ethanol, propanol, water, or a combination comprising at least one of the foregoing.

The boron nitride nanoparticles and solvent are then combined with the fluid medium. This composition is held at about room temperature (e.g., about 10° C. to about 35° C.) and under vacuum (e.g., less than 760 torr (101325 pascals) such as about 30 millitorr (4 pascal)) for less than an hour (e.g., about 15 minutes). The solvent is removed during this time. Reactions between the solvent and the fluid medium are avoided by adjusting the temperature and the time that the solvent is present in the composition. After the solvent is removed, the nanocomposite fluid is ready for further use. According to another embodiment, the nanoparticles are suspended in a non-ionic surfactant and then combined with the fluid medium to form the nanocomposite fluid. In yet another embodiment, the nanoparticles are suspended in a solvent and a surfactant. For some embodiments that include suspending the nanoparticles in the solvent, the solvent is removed after combining with the fluid medium as previously discussed. At this time, additives can be added to the nanocomposite fluid. Alternatively, the additives can be added prior to combining the boron nitride nanoparticles with the solvent and/or the fluid medium. As a further alternative, the composition can be at a temperature from about 0° C. to about 100° C., specifically about 5° C. to about 80° C., and more specifically about 10° C. to about 50° C. under vacuum as the solvent is removed.

To suspend the boron nitride nanoparticles in the fluid medium, the nanoparticles can be derivatized with a functional group. In an embodiment, the functional group is hydroxy so that the nanoparticles are suspended in an aqueous fluid medium (e.g., deionized water). In another embodiment, the functional group is an aliphatic group (for example, a C1-C20 alkyl group) to disperse the nanoparticles in an oil containing fluid medium.

The nanoparticles are electrically insulating and thermally conductive. Additionally, the nanocomposite fluid is also electrically insulating and thermally conductive due to the nanoparticles. To maintain these properties (electrically insulating and thermally conducting), the fluid media and/or additives (or other components) in the nanocomposite fluid are substantially electrically insulating and/or thermally conductive. For example, although carbon nanoparticles can be electrically conductive, the carbon nanoparticles, when used as an additive nanoparticle, are modified (e.g., oxidized) to be electrically insulating. In this way, the thermal conductivity of the nanocomposite fluid is about 0.1 Watts per meter per Kelvin (W/m K) to about 1.2 W/m K, specifically about 0.15 W/m K to about 1.1 W/m K, and more specifically about 0.2 W/m K to about 1 W/m K. In some embodiments, the nanoparticles (e.g., boron nitride nanoparticles such as BNNTs or BNNSs) have a thermal conductivity of about 100 W/m K to about 9500 W/m K, specifically about 125 W/m K to about 8500 W/m K, and more specifically about 150 W/m K to about 8000 W/m K.

Such nanocomposite fluids beneficially provide a high dielectric strength of greater than 6 megavolts per meter (MV/m), specifically greater than 12 MV/m, more specifically greater than 65 MV/m, and even more specifically greater than 90 MV/m. In an embodiment, the dielectric strength is about 6 MV/m to about 90 MV/m.

The nanocomposite fluids have a viscosity of about 0.5 centipoise (cps) to about 6 cps, specifically about 1 cps to about 6 cps, and more specifically about 1 cps to about 5 cps.

Even though the fluid medium may be thermally conductive and/or electrically insulating, the nanoparticles in the nanocomposite fluid enhance these properties by further increasing the thermal conduction and electrical insulation of the nanocomposite fluid. Moreover, a combination of various types of nanoparticles (e.g., BNNTs, BNNS, and/or boron nitride nanosheets) can be disposed in the nanocomposite fluid in various compositional amounts to tune the fluid properties. Such properties include thermal, electrical, flow, and tribological properties Thus, in an embodiment, nanoparticles are dispersed in a fluid medium in an amount effective to result in an enhancement of a property such as increased lubricity, increased thermal conductivity, increased heat transfer capacity, increased electrical insulation, increased control of viscosity, or a combination comprising at least one of the foregoing. As such, the nanocomposite fluid, including the nanoparticles, can be characterized as a thermal conductivity enhancer, electrical insulation enhancer, viscosity controller, or lubricity enhancer. In certain embodiments, thermal conductivity of the nanocomposite fluid is greater than the thermal conductivity of the base materials (nanoparticles and fluid medium) from which it is manufactured. Without wishing to be bound by any specific theory, this increased thermal conductivity may be due to a combination of a high lattice conductivity of BN nanoparticles, an increased surface-to-volume ratio of the nanoparticles as well as nanoconvection caused by Brownian motion of the nanoparticles. Heat transfer is directly proportional to the thermal conductivity. In general, an increase in thermal conductivity results in an increase in the heat transfer through the matrix. When added to a matrix material, such as, the fluid medium (e.g., an oil), the nanoparticle's thermal properties enhance the thermal conductivity of the matrix material. Dramatic increases in thermal conductivity occur when the nanoparticles herein are added to water (de-ionized water) or other electrically non-conductive solutions. Similarly, other physical properties, such as for example, the viscosity of the fluid medium, can be changed by addition of the nanoparticles. Although, boron nitride nanotubes can increase the viscosity of the fluid medium, boron nitride nanospheres can also be added (while maintaining or decreasing the amount of the boron nitride nanotubes) to maintain the thermal conductivity of nanocomposite fluid but decreasing the viscosity of the nanocomposite fluid. In certain embodiments, to achieve a proper balance of desired properties of the nanocomposite fluid, a combination of different amounts of nanoparticles, can be added to the fluid medium. In certain embodiments, the method can include adding additives in a concentration of up to about 30 vol %, specifically up to about 20 vol %, and more specifically up to about 10 vol %, based on the volume of the nanocomposite fluid.

Due to the thermal conductivity and electrical insulating properties of the nanocomposite fluids, they are useful as, for example, heat management (e.g., as a coolant) and/or electrical insulation in environments such as high voltage or temperature-producing environments or equipment. Such environments include downhole environments having downhole articles such as a transformer, motor, pump, resistive heater, induction heater, drill bit, sensor, current source, or a combination comprising at least one of the foregoing.

In a non-limiting embodiment, a process for cooling a downhole element includes disposing the nanocomposite fluid downhole and contacting the downhole element with the nanocomposite fluid to cool the downhole element. The process can further include circulating the nanocomposite fluid downhole and contacting the nanocomposite fluid with a heat exchanger to decrease the temperature of the nanocomposite fluid. The heat exchanger can be located either at the surface or within a borehole.

According to an embodiment, a nanocomposite fluid described herein is used in a downhole electrical submersible pumping system (ESP) that is disposed in a borehole, wherein the borehole may intersect a subterranean formation. As shown in the FIGURE, the ESP includes at a lower end a motor 10, a seal (not shown), and a pump (not shown) on an upper end. The motor 10 and pump are separated by the seal. The motor 10 includes a rotor 20 (or a plurality of rotors 20) and bearings 30 mounted on a motor shaft 40 that is coupled to and drives the pump. The motor shaft 40 is coupled to the pump via a seal section, and the motor shaft 40 is coupled to a shaft in the seal section, which in turn is coupled to a shaft in the pump. The rotor 20 can be a hollow cylinder made of a stack of laminations, a copper bar and end rings, which is supported at each end by the bearings 30. The motor 10 is filled with nanocomposite fluid 50 having a composition as described herein and includes a running clearance 60 located between the internal diameter of the stator 70 and outside diameter of the rotors 20 wherein the nanocomposite fluid 50 provides thermal conduction, electrical insulation, and lubrication for items such as the bearings 30 in order to carry away (dissipate) heat generated by friction from the rotor 20 and windage losses while being an electrical insulator between the stator 70 and the rotor 20. The nanocomposite fluid 50 within the running clearance 60 can be circulated within the motor 10 through a hole 80 in the shaft 40. The nanocomposite fluid 50 in the motor can also be used in the seal and communicates and circulates between the seal and motor 10. The nanocomposite fluid 50 used in the seal assists with the cooling of a bearing (e.g., a thrust bearing) in the seal. The nanocomposite fluid 50 within the motor 10 and seal can include up to about 30 vol % of nanoparticles, specifically up to about 20 vol % of nanoparticles, and more specifically up to about 10 vol % of nanoparticles, based on the volume of the nanocomposite fluid. The nanoparticles are boron nitride nanoparticles and can be derivatized with functional groups. Further, the nanocomposite fluid can include additives such as, but not limited to, carbon nanotubes, carbon nano-onions, graphite nanoparticles, carbon nanotubes, nanodiamonds or their derivatives, ceramic nanoparticles, or a combination comprising at least one of the foregoing.

In another embodiment, the nanocomposite fluid is disposed in an electrical transformer. Such transformers can be used to convert an input voltage to an output voltage by stepping up or stepping down the input voltage via inductive coupling. The input voltage may be generated by an external power supply or by a downhole alternator using a multistage turbine or a mud motor driven by mud flow and connected to a magnetic shaft, which rotates within a windings package. During rotation of the magnetic shaft, a changing magnetic flux induces an electric current in the windings of the windings package. The nanocomposite fluid provides an additional electrical insulation to the windings and power leads in the transformer, preventing electrical breakdown within the transformer. Additionally, the nanocomposite fluid contacts the windings and its core to, for example, absorb heat from them and can subsequently release the heat into a heat sink to cool the transformer by transferring heat away from the windings and other elements that may heat up within the transformer during operation. In some embodiments, the heat sink is the nanocomposite fluid. The nanocomposite fluid can be circulated and contact a heat exchanger or can continue to absorb heat from the transformer's components due to the heat capacity of the nanocomposite fluid.

In a non-limiting embodiment, a non-contact heater such as an induction heater can be cooled or the components thereof electrically insulated by the nanocomposite fluid. The induction heater can include a work coil (also referred to as an inductor), work head (containing, e.g., a transformer), and power unit. In an exemplary embodiment, power transfers from the power unit to a workpiece via the work coil. The work coil can be interposed between two dielectric members (e.g., ceramic tubes such as concentric ceramic tubes), and the workpiece can be disposed inside the inner ceramic tube or external to the outer ceramic tube to be inductively heated by the work coil. The nanocomposite fluid can contact the work coil between the dielectric members to transfer heat from the work coil. In certain embodiments, the work coil can include an internal fluid channel through which the nanocomposite fluid can flow in order to disperse heat from the work coil. Additionally, the nanocomposite fluid can be used to cool the power unit and work head.

According to another embodiment, the nanocomposite fluid is used as a dielectric material in electric discharge machining (EDM). In EDM, a pulsed electrical discharge forms an arc that passes between an electrode (also referred to as tool electrode) and a workpiece (also referred to as a workpiece electrode) through the dielectric material. As a result of the electrical discharges, matter is removed from the workpiece. The nanocomposite fluid (e.g., a flow of nanocomposite fluid) insulates the electrode from the workpiece and can also remove debris (e.g., metal, including molten metal) from the work zone between the electrode and the workpiece. Further, the nanocomposite fluid also can effectively cool the workpiece near the discharge location, which may provide high machining tolerance. By performing EDM, for example, on a downhole element, the downhole element may be shaped or a portion (or, alternatively the entire element) completely disintegrated or cut away for removal from the downhole environment.

Thus, in an embodiment, a method for cutting a workpiece includes disposing an electrode proximate to and spaced apart from the workpiece, disposing the nanocomposite between the electrode and the workpiece, and passing an electric discharge through the nanocomposite fluid to cut (or machine) the downhole element. The method further includes moving the electrode to a new position of the workpiece. Further, the distance between the electrode and workpiece can be adjusted. Additionally, the nanocomposite fluid can flow between the electrode and the workpiece for removing debris (including molten metal) therebetween. The debris can include material that has been removed from the workpiece or electrode or material that is extraneous to the cutting process. According to an embodiment, the workpiece is a downhole element such as a valve, tubular, wire, cable, pin, bolt, anchor, clamp, and the like.

In an embodiment, the fluid medium of the nanocomposite fluid is an aqueous medium, particularly de-ionized water. Alternatively or additionally, the fluid medium can include a high resistivity fluid that is electrically insulating, which can have an electrical resistivity of at least 10 megaohms centimeter (MΩ cm), specifically at least 15 MΩ cm, and more specifically at least 20 MΩ cm, based on its resistivity at 25° C. An enclosing member may surround the electrode and workpiece to isolate these items from the downhole environment as the nanocomposite fluid is introduced. Such an enclosure will preserve the nanocomposite fluid from contaminants that would cause the nanocomposite fluid to have a decrease in its electrical insulating properties or become electrically conductive. The nanocomposite fluid can be circulated through the enclosing member to refresh the nanocomposite fluid between the electrode and workpiece.

In an additional embodiment, the nanoparticles herein (e.g., BNNTs, BNNSs, BN nanosheets, and the like) can be used without the fluid medium. According to an embodiment, a seal can include the nanoparticles. In an exemplary embodiment, a seal includes an elastomer; and boron nitride nanoparticles disposed in the elastomer, wherein the seal is thermally conductive and electrically insulating. The thermal conduction and electrical insulation properties of the seal derives at least in part from the boron nitride nanoparticles. Due to addition of the nanoparticles, the electrical resistivity of the seal is greater than $1 \times 10^{12}$ ohm-cm, specifically greater than $1 \times 10^{15}$ ohm-cm, and more specifically greater than $1 \times 10^{18}$ ohm-cm. In some embodiments, the electrical resistivity can be about $1 \times 10^{15}$ ohm-cm to about $1 \times 10^{19}$ ohm-cm. Additionally, the dielectric strength of the seal is equal to or greater than 150 kV/mm, specifically equal to or greater than 200 kV/mm, and more specifically equal to or greater than 250 kV/mm. In certain embodiments, the dielectric strength is about 150 kV/mm to about 325 kV/mm. The thermal conductivity of the seal can be about 0.5 W/m K to about 5 W/m K, specifically about 1 W/m K to about 4 W/m K, and more specifically about 1 W/m K to about 3 W/m K.

According to a non-limiting embodiment, the elastomer includes polytetrafluoroethylene (PTFE), nitrile-butyl rubber (NBR), hydrogenated nitrile-butyl rubber (HNBR), high fluorine content fluoroelastomer rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

The amount of the nanoparticles can be about 0.05 wt % to about 20 wt %, specifically about 0.5 wt % to about 15 wt %, and more specifically about 1 wt % to about 10 wt %, based on the weight of the seal. A combination of boron nitride nanoparticles can be used in the seal, for example, BNNTs and BNNSs can be disposed among the elastomer.

In a further embodiment, the seal can include the fluid medium herein among the chains of the elastomer. The seal can be impregnated with the fluid medium during making the seal or after. The fluid medium can be uniformly or non-uniformly disposed in the seal. In an embodiment, the fluid medium can penetrate from the surface of the seal to some depth of the seal in, for example, a concentration gradient. Such seals can be used in submersible pumps, valves, and the like. The seals can be any shape including O-rings, T-rings, gaskets, and the like.

The seal can be made by compounding pellets of the elastomer with the nanoparticles, optionally adding the fluid medium to the composition, and then molding the composition into a shape. The elastomer can be cured via application of heat or radiation, e.g., ultraviolet light, as a result of the presence of crosslinkable moieties of the elastomer or addition of a crosslinking agent.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A seal comprising:
   an elastomer; and
   boron nitride nanoparticles disposed in the elastomer,
   wherein the seal is thermally conductive and electrically insulating, and
   wherein the boron nitride is present in an amount of about 0.05 wt% to about 20 wt%, based on the weight of the seal.

2. The seal of claim 1, wherein the electrical resistivity of the seal is greater than $1 \times 10^{12}$ ohm-cm.

3. The seal of claim 1, wherein the dielectric strength of the seal is equal to or greater than 15 kV/cm.

4. The seal of claim 1, wherein the thermal conductivity of the seal is about 1 W/m K to about 3 W/m K.

5. A seal comprising:
   an elastomer; and
   boron nitride nanoparticles disposed in the elastomer,
   wherein the seal is thermally conductive and electrically insulating; and
   wherein the elastomer comprises polytetrafluoroethylene, nitrile-butyl rubber, hydrogenated nitrile-butyl rubber, fluoroelastomer rubber, organopolysiloxane, tetrafluoroethylene-propylene elastomeric copolymer, ethylene-propylene-diene monomer rubbers, polyvinylalcohol, or a combination comprising at least one of the foregoing.

6. A seal comprising:
   an elastomer; and
   boron nitride nanoparticles disposed in the elastomer, wherein the boron nitride is derivatized with a functional group.

7. The seal of claim 6, wherein the functional group is a alkyl group, hydroxyl group, or a combination comprising at least one of the foregoing.

8. The seal of claim 1, wherein the boron nitride is a nanotube, nanosphere, nanosheet, nanowire, nanorod, or a combination comprising at least one of the foregoing.

9. The seal of claim 8, wherein the boron nitride is the nanotube which has an aspect ratio of about 10 to about 400.

10. The seal of claim 9, wherein the boron nitride is the nanosphere which has a diameter of about 5 nm to about 800 nm.

11. The seal of claim 1, wherein the boron nitride comprises boron nitride nanotubes and boron nitride nanospheres.

12. The seal of claim 1 further comprising boron nitride microparticles.

13. A seal comprising:
an elastomer; and
boron nitride nanoparticles disposed in the elastomer; and
an additive nanoparticle including carbon nanotubes, fullerenes, nanodiamonds, graphene, polysilsesquioxanes, inorganic nanoparticles, nanoclays, or a combination comprising at least one of the foregoing.

14. The seal of claim 1 further comprising a fluid medium.

15. The seal of claim 14, wherein the fluid medium is included among the chains of the elastomer.

16. An article comprising the seal of claim 1.

17. The article of claim 16 wherein the article is a submersible pump, a valve, an O-ring, a T-ring, or a gasket.

18. A method of making a seal, the method comprising:
compounding an elastomer with boron nitride nanoparticles to provide a composition; and
molding the composition into a shape.

19. The method of claim 18, further comprising adding a fluid medium to the composition.

20. The method of claim 18, further comprising crosslinking the elastomer.

21. The seal of claim 1, wherein the elastomer comprises a perfluoroelastomer.

* * * * *